United States Patent
Koch et al.

(10) Patent No.: US 9,665,801 B1
(45) Date of Patent: May 30, 2017

(54) METHOD AND SYSTEM FOR EXTRACTING ALPHANUMERIC CONTENT FROM NOISY IMAGE DATA

(71) Applicant: Open Text Corporation, Waterloo (CA)

(72) Inventors: Guillaume B. Koch, San Jose, CA (US); Arnaud G. Flament, Sunnyvale, CA (US)

(73) Assignee: Open Text Corporation, Waterloo (CA)

( * ) Notice: Subject to any disclaimer, the term of this patent is extended or adjusted under 35 U.S.C. 154(b) by 11 days.

(21) Appl. No.: 14/673,472

(22) Filed: Mar. 30, 2015

(51) Int. Cl.
 *G06K 9/00* (2006.01)
 *G06K 9/62* (2006.01)
 *G06K 9/40* (2006.01)

(52) U.S. Cl.
 CPC .......... *G06K 9/6264* (2013.01); *G06K 9/40* (2013.01); *G06K 9/6202* (2013.01); *G06K 2209/01* (2013.01)

(58) Field of Classification Search
 CPC ...... G06K 9/6264; G06K 9/6202; G06K 9/40; G06K 2209/01
 USPC .......... 382/181, 186–190, 195, 209, 224–231
 See application file for complete search history.

(56) References Cited

U.S. PATENT DOCUMENTS

| | | | | |
|---|---|---|---|---|
| 2006/0251338 | A1* | 11/2006 | Gokturk ............ | G06F 17/30253 382/305 |
| 2010/0278453 | A1* | 11/2010 | King ...................... | G06Q 10/10 382/321 |
| 2011/0004587 | A1* | 1/2011 | Schambach ....... | G06F 17/30997 707/706 |

OTHER PUBLICATIONS

Oflazer, Kemal. "Error-tolerant finite-state recognition with applications to morphological analysis and spelling correction." Computational Linguistics 22.1 (1996): 73-89.*

* cited by examiner

*Primary Examiner* — Andrew Moyer
(74) *Attorney, Agent, or Firm* — Sprinkle IP Law Group

(57) ABSTRACT

In general, embodiments of the technology relate to extracting content from documents. More specifically, embodiments of the technology relate to using fuzzy regular expressions to process content results obtained from one or more documents in order to extract content for these documents. Further, embodiments of the technology enable the format modification of the content after the content has been identified and extracted from the documents.

17 Claims, 11 Drawing Sheets

Word: "type"
 Character: "t", "T"( 17); "l"( 10)
 Character: "y"
 Character: "p"
 Character: "e", "o"( 1)

METHOD AND SYSTEM FOR EXTRACTING ALPHANUMERIC CONTENT FROM NOISY IMAGE DATA

BACKGROUND

A significant amount of documents are stored on computing systems, where these documents are stored as images. Analyzing these documents typically involves analysis of the content (e.g., words, numbers, symbols) of these documents. In order to perform this analysis, the content must first be extracted. Extraction of the content is an error prone process.

DETAILED DESCRIPTION

Figure 1:
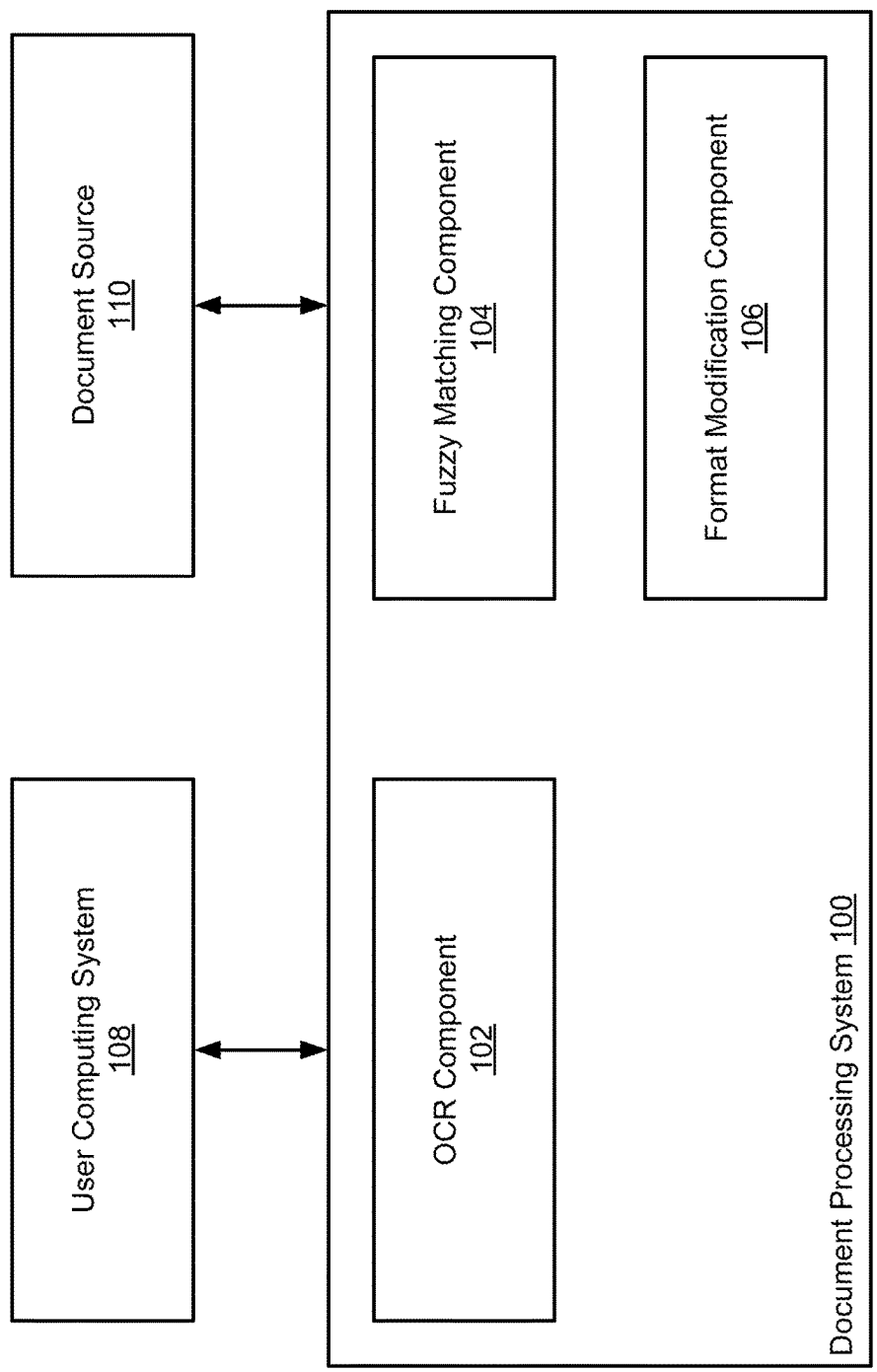
FIG. 1 shows an example system in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology relate to extracting content from documents. More specifically, embodiments of the technology relate to using fuzzy regular expressions to process OCR results obtained from one or more documents in order to extract content for these documents. Further, embodiments of the technology enable the format modification of the content after the content has been identified and extracted from the documents.

FIG. 1 shows an example system in accordance with one or more embodiments of the technology. The system includes a document processing system (100), one or more user computing systems (108), and one or more document sources (110). Each of these components is described below.

In embodiment of the technology the user computing system (108) corresponds to a computing system (see e.g., FIG. 8) that includes functionality to interface with the document processing system and/or the document source. The user computing system may include functionality to: (i) send a request to the document processing system to process a document in accordance with FIGS. 4 and 5A-5B and (ii) to receive and display the results of the aforementioned processing. The user computing system may provide a document(s) for processing directly to the document processing system and/or indicate which document(s) the document processing system should process from the document source without providing the document(s) to the document processing system. In such cases, the document processing system may include functionality to obtain the document directly from the document source. In one embodiment of the technology, the user computing system may include a user interface (e.g., a graphical user interface) through which a user of the user computing system may specify the document, a regular expression (discussed below, see e.g., FIG. 5B) and/or a format modification (discussed below, see e.g., FIG. 4). The user computing system may interface (or otherwise communicate) with the document source and the document processing system using any combination of wired and/or wireless communication.

In one embodiment of the technology, the document source (110) includes persistent storage in which one or more documents are stored. In one embodiment of the technology, one or more of the documents stored in document source (110) include at least some content that is included within the document as an image (i.e., an image portion of a document), where the content in the image portion may be extracted using OCR. The content in the image portion may include any combination of letters (in any language), numbers (in any language), and/or symbols. The document source may also include functionality to service requests for documents from the user computing system and/or the document processing system. The document source may interface (or otherwise communicate) with the user computing system and the document processing system using any combination of wired and/or wireless communication.

Figure 4:
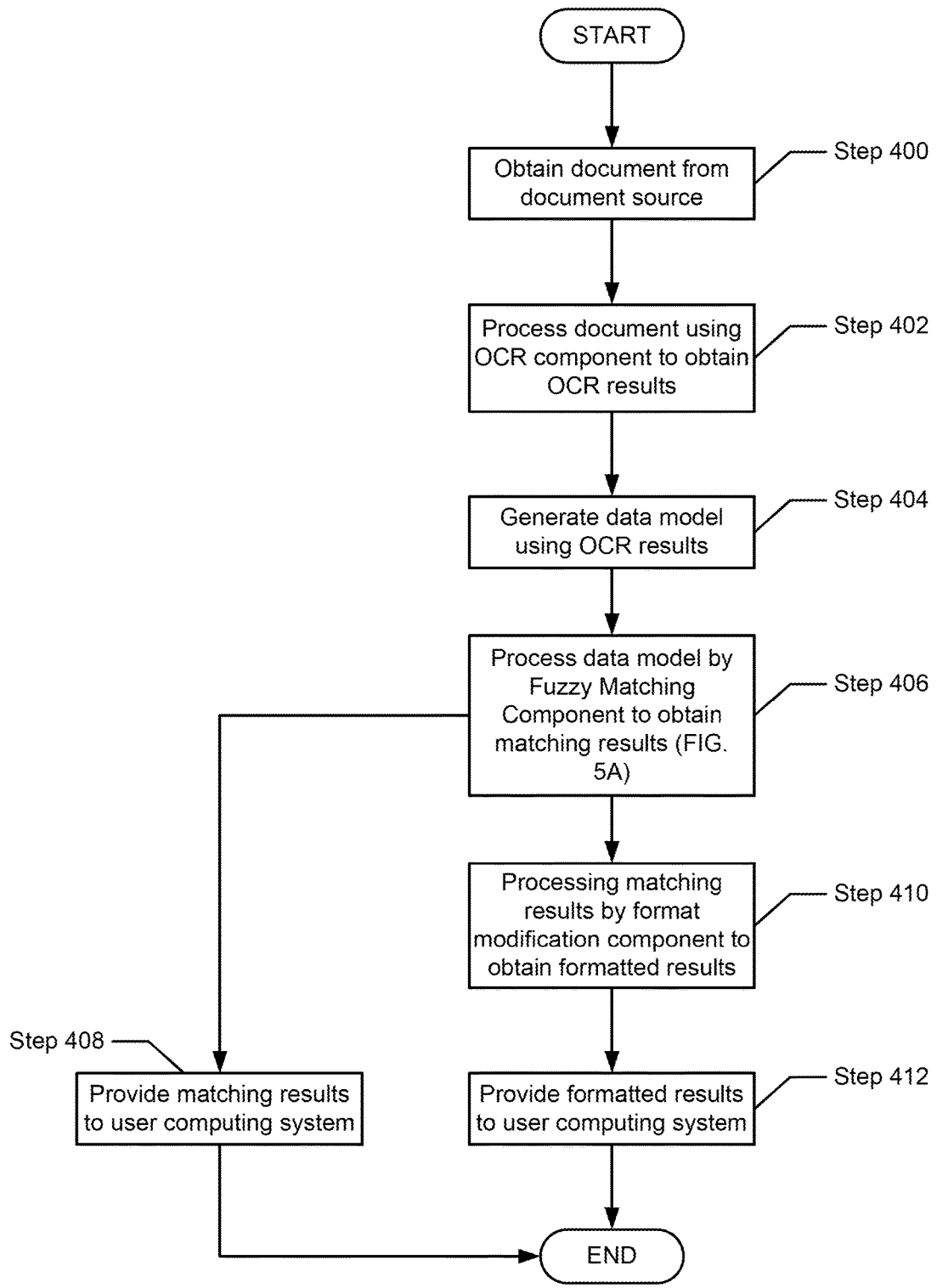
FIGS. 4-5B show example methods for processing documents in accordance with one or more embodiments of the technology.
Figure 5A:
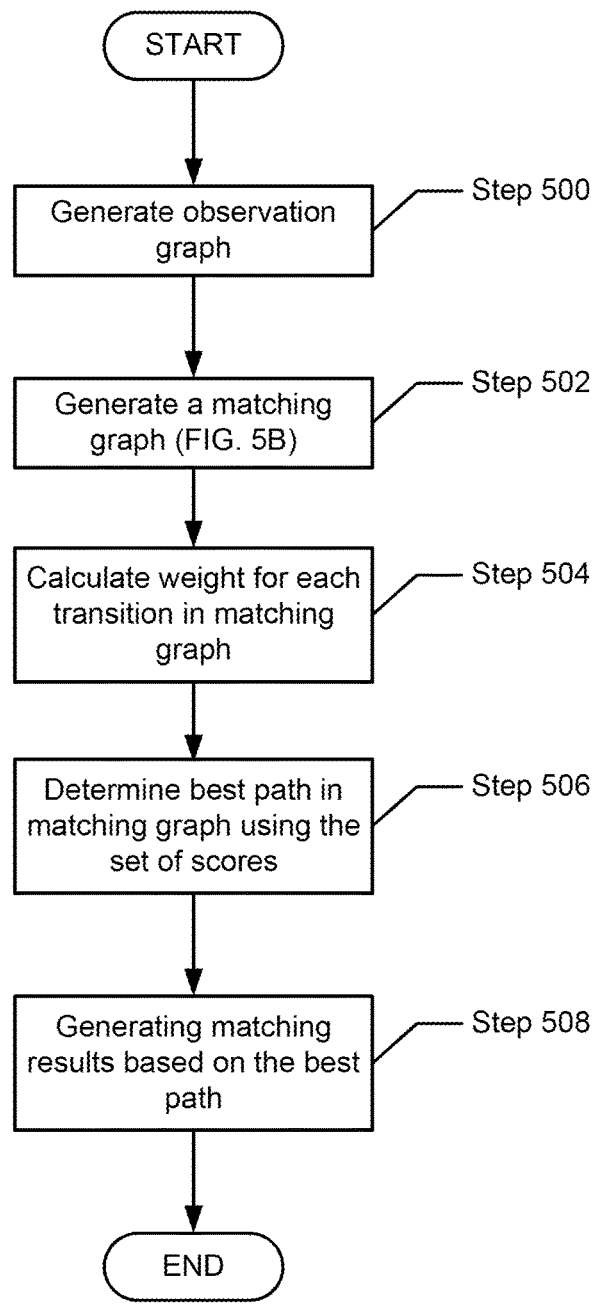
Figure 5B:
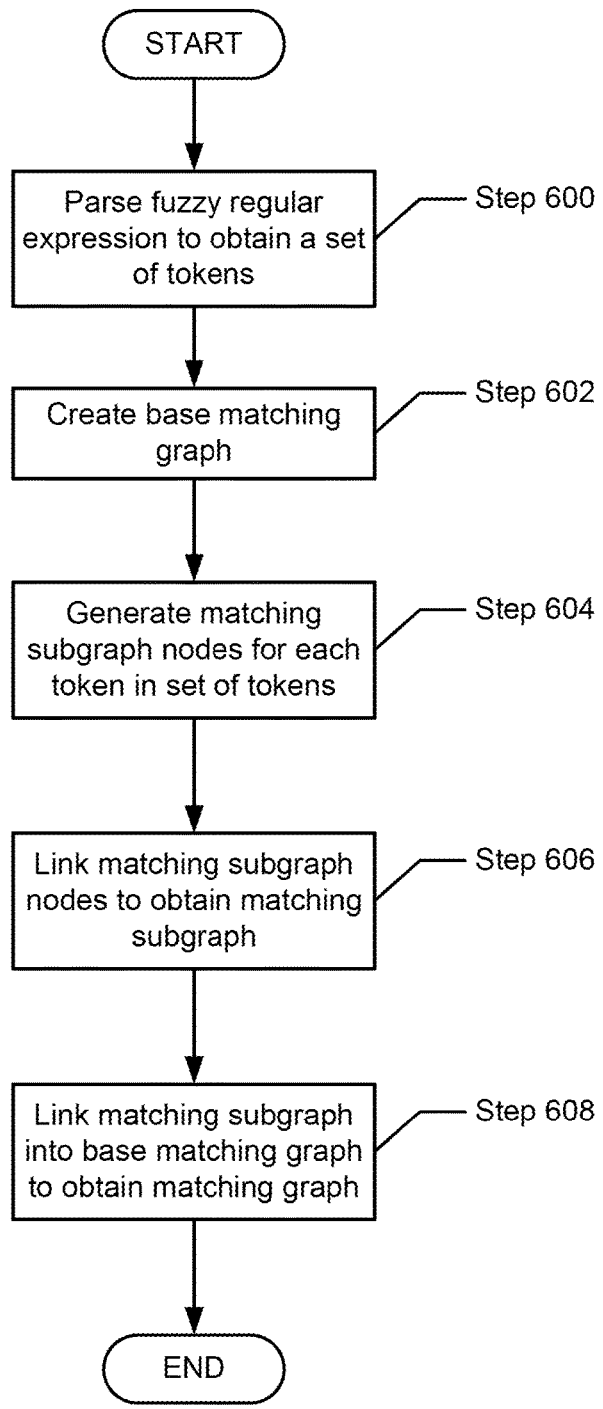

The document processing system (100) includes functionality to process documents in accordance with FIGS. 4-5B. The document processing system may include an optical character recognition (OCR) component (102), a fuzzy matching component (104), and a format modification component (106). The document processing system also includes functionality to interface with the user computing system (108) and the document source (110). The document processing system may interface with the aforementioned components using any wired and/or wireless communication mechanisms.

Figures 2A, 2B:
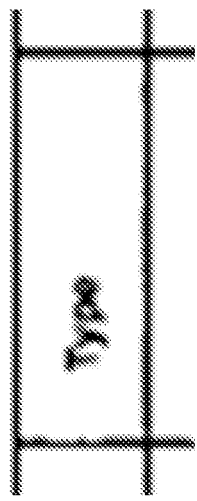
FIGS. 2A-2B show an example of generating a data model in accordance with one or more embodiments of the technology.

In one embodiment of the technology, the OCR component (102) includes functionality to obtain a document from the document source (110) and process the document using any known or later discovered OCR technique/algorithm in order to generate OCR results. Additionally, or alternatively, the OCR component may include functionality to obtain OCR results for a document from an external OCR component (not shown). In one embodiment of the technology, the OCR results includes a hypothesis and a confidence value for each element in the image portion that is processed using OCR. For example, if the image portion included an image of the word "Type" (see e.g., FIG. 2A), then the OCR results may include at least four hypotheses, namely, one for each element in the word "Type." The OCR component (102) may also include functionality to generate a data model using the OCR results. The data model may include all the content from the OCR results or it may include only a portion of the content from the OCR results. The data model generated by the OCR component may subsequently be used by other components in the data processing system. The use of a data model by the OCR component allows the OCR component to receive OCR results in different formats from various external OCR components and to generate data models in a common format, where this common format is understood by other components in the data processing system. An example of the generation of a data model is shown in FIGS. 2A-2B. In one embodiment of the technology, the OCR component may include functionality to generate a data model using content from a document that is not extracted using OCR. For example, if the document is a text file then the data model may be generated directly from the text in the text file.

In one embodiment of the technology, the fuzzy matching component (104) includes functionality to process the OCR results and/or data models (which may or may not be generated using the OCR results) in accordance with the methods shown in FIGS. 4-5B. More specifically, the fuzzy matching component may include functionality to: generate an observation graph (see e.g., FIG. 3A) from the data model or OCR results; generate a matching graph based on a fuzzy regular expression (see e.g., FIGS. 3A, 3B, and 5B); and determine whether any content in the document (extracted using OCR) matches the fuzzy regular expression using the observation graph and the matching graph (see e.g., FIG. 5A). In the event that there is a matching portion identified in the document (see e.g., FIG. 5), then the fuzzy matching component may be provide this information (also referred to as a matching result) directly to the user computer system (108) or to the format modification component (106) for further processing. Additional detail about the matching result and the formatting of the matching resulting is described, e.g. in FIG. 4.

In one embodiment of the technology, the format modification component (106) includes functionality to obtain formatting instructions from the user computing system (or another source) and apply the formatting instructions to the matching results to obtain modified match results (see e.g., FIG. 5A). In such scenarios, modified matching results may be provide to the user computing system instead of, or in addition to, the matching results.

Those skilled in the art will appreciate that the technology is not limited to the system shown in FIG. 1.

FIGS. 2A-2B show an example of generating a data model in accordance with one or more embodiments of the technology. Turning to FIG. 2A, FIG. 2A shows an exemplary image portion of a document. In this example, the image portion includes the word "Type." As discussed above, the above image portion may be processed by an OCR component (102 in FIG. 1 or by an external OCR component) to generate OCR results. The OCR results may include a hypothesis (i.e., a corresponding character, symbol, or number) for each element in the image portion along with a confidence value (typically expressed as a percentage or a value between 0 and 1). As discussed above, the OCR results may then be used to generate a data model. FIG. 2B shows an exemplary data model based on the OCR results for the image portion shown in FIG. 2A Referring to FIG. 2B, in this example, the data model is organized in a hierarchical tree structure. The data model may group elements from the image portion into various nodes within the hierarchical tree structure. For example, in FIG. 2B, the elements from the image portion in FIG. 2A are grouped under a parent node with the heading 'Word: "lype"', where "lype" reflects the aggregate hypothesis with the highest confidence value for each element. The aforementioned parent node may include q child node for each element associated with the parent node. In this example, there are four child nodes—one for each element in that is grouped under the parent node. Each of the child nodes includes one or more hypotheses and, if applicable, an associated confidence value (expressed as a percentage). If there is only one hypothesis for a given element, then the child node only includes this hypothesis and the confidence value is set to 100% (or 1). The confidence value may not be shown in the event that there is only one hypothesis. Further, the confidence value may not be shown for the hypothesis with the highest confidence value when an element is associated with multiple confidence values.

For example, referring to FIG. 2B, the first child node specifies that the element is a "character" and includes three hypotheses for this element, namely, "1", "T", and "1." Further, each element is associated a confidence value, i.e., "1" has a confidence value of 83%, "T" has a confidence value of 17%, and "1" has a confidence value of 10%. In this example, the hypothesis with the highest confidence value is "1", accordingly, this is the hypothesis that is used in the parent node as part of the aggregate hypothesis. In one embodiment of the technology, the order of the child nodes in the data model matches the order of the elements shown in the parent node. For example, in FIG. 2B, the elements in the parent node are ordered as follows: 1, y, p, e. Accordingly, the order child nodes of the aforementioned parent node matches this ordering.

The format of the data model is not limited to the format shown in FIG. 2B.

Figure 3A:
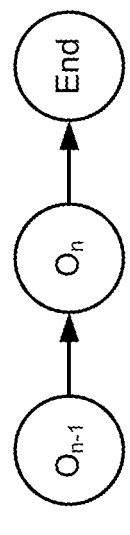
FIGS. 3A-3C shows various graphs in accordance with one or more embodiments of the technology.
Figure 3A:
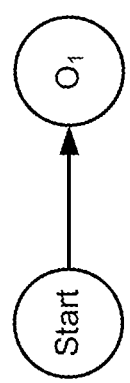
Figure 3B:
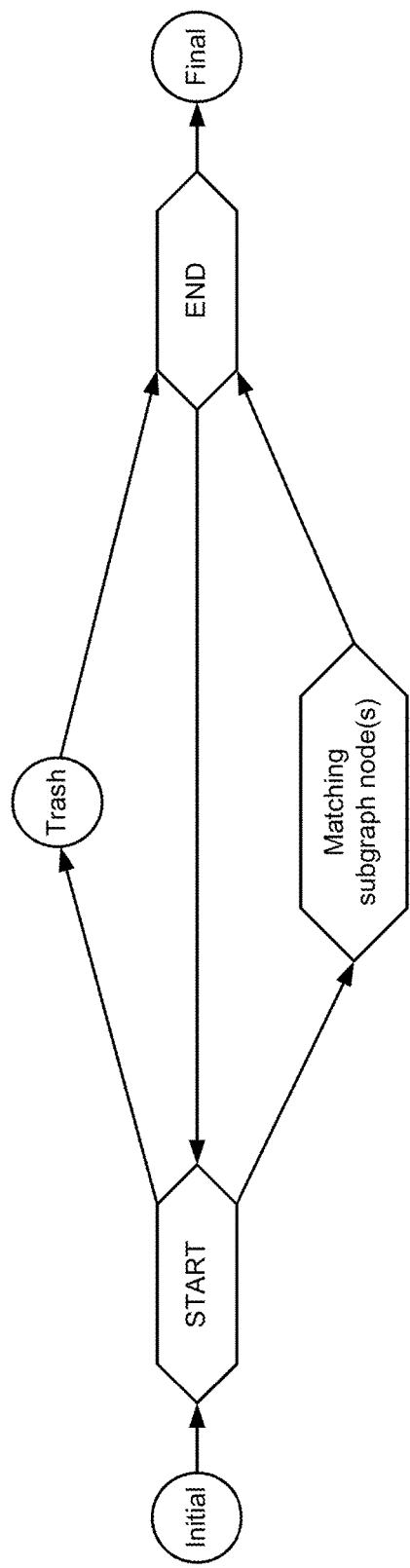
Figure 3C:
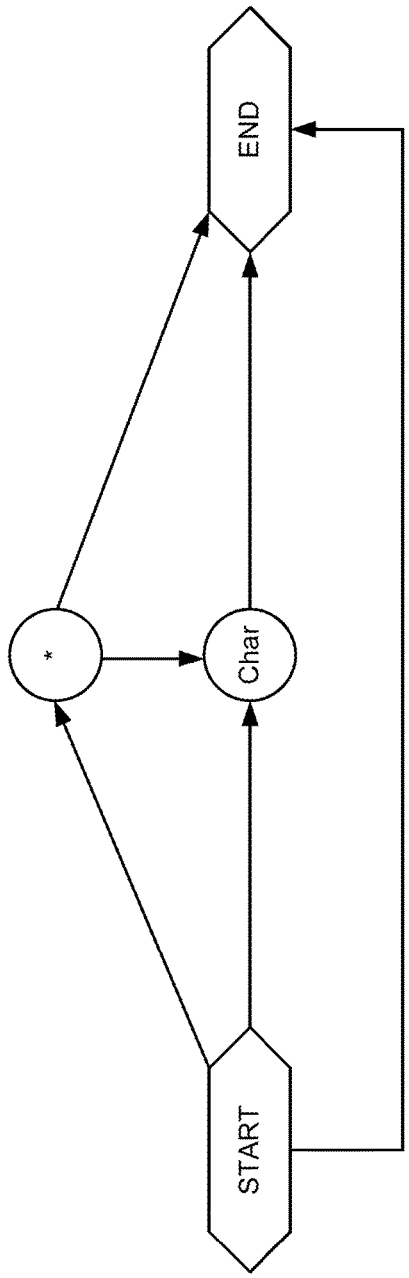

FIGS. 3A-3C shows various graphs in accordance with one or more embodiments of the technology.

FIG. 3A shows an example observation graph in accordance with one or more embodiments of the technology. The observation graph includes a start node, an end node, and one or more observation node. Each observation graph is associated with all or a portion of a data model (see e.g., FIG. 2B). The content of the observation graph may vary based upon which portion of the data model is used to generated the observation graph. For example, the data model may include multiple lines, where each line includes one or more words (which may include letters, numbers, and/or symbols). In such cases, there may be an observation graph generated per line. Alternatively, there may be an observation graph for the entire data model that includes all lines.

The observation graph includes all hypotheses associated with the portion of the data model upon which it is based. More specifically, the observation graph includes a node (e.g., $O_1, O_{N-1}, O_N$) for each hypothesis for the portion of the data model upon which it is based. For example, assume that an observation graph is generated using the entire data model shown in FIG. 2B. In this example, the observation graph would include a start node, an end node, and seven observation nodes, i.e., an observation node for each of the following hypotheses: "1", "T", "1", y", "p", "e", and "o". Further, each observation node includes an observation node score ($S_O$) generated using equation 1: $S_O = \alpha^{1-C}$, where α is a constant and C is the confidence value for the hypothesis in the data model expresses as a number between 0 and 1. The value of α may be a number between 0 and 1 and is set based a number of factors, which may vary based on implementation. One possible value of a is 0.9. The technology is not limited to this value of a.

In one embodiment of the technology, the observation nodes in the graph are ordered based on the ordering in the corresponding data mode. For example, if the observation graph is generated using the data model shown in FIG. 2B, the nodes in the observation graph would be organized as follows:

Start→["1", "T", "1"]→"y"→"p"→["e", and "o"]→End, where there is an edge between the start node and each of the following observation nodes: "1", "T", "1", where there is an edge between each of the following observation nodes: "1", "T", "1" and observation node "y", where there is an edge between observation node "y" and observation node "p", where there is an edge between observation node "p" and each of the following observation nodes: "e", "o", and where there is an edge between each of the following observation nodes: "e", and "o" and the end node.

In one embodiment of the technology, there is an observation edge weight associated with each edge in the observation graph. The observation edge weight may vary based on implementation. In one embodiment of the technology, the observation edge weight for each edge in the observation graph is 1.0. The technology is not limited to this value.

FIG. 3B shows an example matching graph in accordance with one or more embodiments of the technology. The matching graph is generated using a fuzzy regular expression. In one embodiment of the technology, a fuzzy regular expression includes a matching pattern and a threshold. The matching pattern corresponds to a string (which includes any combination of letters, numbers, and symbols) against which the observation graph is being evaluated in order to determine whether the string or a portion thereof is present in OCR results obtained from a document. Said another way, the observation graph is a representation of the content extracted from the image portion of a document using OCR and the matching graph is used to determine whether a string (or a portion thereof) is present in the extracted content. The threshold associated with the fuzzy regular expression may vary between 0 and 1 (or between 0% and 100%), where 0 requires no components of the fuzzy regular expression to be present in the content extracted from the image portion of a document and 1 requires that 100% components of the fuzzy regular expression to be present (in the order specified by the fuzzy regular expression) in the content extracted from the image portion of a document. For example, if the fuzzy regular expression is [A-Z]\d{2}, which corresponds to a string that includes one capital letter followed by two numbers (from 0 to 9), and a threshold of 0.6 (corresponding to at least a 60% match), then the "A12" and "123" both match the aforementioned fuzzy regular expression. However, "AA1" does not match the fuzzy regular expression as there is only a 33% match in "1A1."

Continuing with the discussion of FIG. 3B, the matching graph includes an initial state, an end state, a trash, state, one or more matching subgraph nodes (see e.g., FIG. 3C). In one embodiment of the technology, the trash state consumes observation nodes that do not match all or a portion of the fuzzy regular expression. However, the trash nodes only consume observation nodes that precede or following a matching portion in the observation graph. For example, if the fuzzy regular expression is "R12" and the observation nodes in an observation graph are "4→5→R→1→2", the first two observation nodes "4" and "5" would be consumed by the trash state. In another example, if the fuzzy regular expression is "R12" and the observation nodes in an observation graph are "1→R→1→X→2→A", then observation nodes "1" (the first observation node with "1"), "2" and "A" would be consumed by the trash state but observation "X" would be consumed by a * state (described below) as it is in the matching portion of the observation graph.

In one embodiment of the technology, each matching subgraph node corresponds to a component (e.g., one or more numbers, one or more letters, one or more symbols) of the fuzzy regular expression. For example, if the fuzzy regular expression is [A-Z]\d{2}, then there may be three matching subgraph nodes in the matching graph—namely, one matching subgraph node for the capital letter, one matching subgraph node for the first number, and one matching subgraph node for the second number. The ordering of the matching subgraph nodes in the matching graph is dictated by the order of the components in the fuzzy regular expression. For example, the order of the matching subgraph nodes generated using the fuzzy regular expression [A-Z]\d{2} is as follows: matching subgraph node for the capital letter→matching subgraph node for the first number→matching subgraph node for the second number.

FIG. 3C shows an example matching subgraph node in accordance with one or more embodiments of the technology. Each matching subgraph node includes two states, denoted, * and char. The * state (also referred to as a wildcard state) may consume any observation node and the char state (also referred to as an exact match state) may only consume an observation node that exactly matches the corresponding component in the fuzzy expression. An example of the use of the wildcard state and the char state are described below in FIGS. 4-5B and in the examples shown in FIGS. 6-7E.

With reference to FIGS. 3B-3C, there are only five possible types of states in a matching graph: initial, final, trash, char, and *. The remaining information in the graphs shown in FIGS. 3B-3C, namely, the start and end blocks are merely included for ease of representation but are not considered states for the purposes of evaluating the best path through the matching graph (see e.g., FIG. 5A). Said another way, the best path through the matching graph for a given set of observation nodes is the set of states in the matching graph that are traversed between the initial state and the final state, where the possible states to traverse are: (i) the trash state; (ii) a * state in one or more matching subgraph nodes, and (iii) a char state in one or more matching subgraph nodes. In one embodiment of the technology, there is a weight associated when transitioning between states within (or between) matching subgraph nodes. The following table summarizes the weights associated with various transitions in accordance with one or more embodiments of the technology.

TABLE 1

State Transition Weights

| Transition Type | Source State/Block | Destination State/Block | Transition Weight |
|---|---|---|---|
| Trash Insertion | any state * | Trash char (in same matching subgraph node a source * state) | α $\alpha^2$ |

TABLE 1-continued

State Transition Weights

| Transition Type | Source State/Block | Destination State/Block | Transition Weight |
|---|---|---|---|
| Substitution | * | Any state or End Block (in same matching subgraph node a source * state) | $\alpha^{1+T}$ |
| Exact match | Start Block | char (in same matching subgraph node as Start Block) | $\alpha^T$ |
| Deletion | Start Block | End Block (in same matching subgraph node as Start Block) | $\alpha^T$ |

In the above table, α, as discussed above, may be a number between 0 and 1 and is set based a number of factors, which may vary based on implementation. One possible value of α is 0.9. Further, T is the threshold associated with the fuzzy regular expression, where T is a value between 0 and 1.

The following section describes various flowcharts in accordance with one or more embodiments of the technology. While the various steps in this flowchart are presented and described sequentially, one of ordinary skill will appreciate that some or all of the steps may be executed in different orders, may be combined or omitted, and some or all of the steps may be executed in parallel.

FIGS. 4-5B show example methods for processing documents in accordance with one or more embodiments of the technology.

In step 400, a document(s) is obtained from a document source. In one embodiment of the technology, the document(s) obtained from the document source is specified by a user via a user computing system. In step 402, the document(s) is processed by an OCR component in order to obtain OCR results.

In step 404, a data model is generated using the OCR results obtained in step 402. As discussed above, in an alternate embodiment of the technology, the OCR results are obtained from an external source (i.e., a source external the document processing system) and then processed by the document processing system in order to generate the data model. In such cases, steps 400 and 402 may not be performed by the document processing system.

In step 406, the data model is provided to the fuzzy matching component, which subsequently processes the content in the data model in order to obtain matching results. Additional detail about step 406 is shown in FIG. 5A.

Referring to FIG. 5A, in step 500, an observation graph(s) is generated using all (or a portion of) the data model. Alternatively, as discussed above, if the data model is not present (or otherwise generated), then the observation graph may be generated using the OCR results. The specific portion of the data model that is used to generate the observation graph may vary based on the implementation of the technology.

In step 502, a matching graph is generated based on a fuzzy regular expression. The fuzzy regular expression and, optionally, the threshold, may be provided by a user via the user computing system. The fuzzy regular expression and/or the threshold may be provided by another entity without departing from the technology. Additional detail about the generation of the matching graph in accordance with one embodiment of the technology is described in FIG. 5B.

Referring to FIG. 5B, in step 600, the fuzzy regular expression is parsed to obtain a set of tokens, where each token corresponds to a component in the fuzzy regular expression. For example, if the fuzzy regular expression is [A-Z]\d{2}, then three tokens would be obtained in step 600—a first token for [A-Z], a second token of d and a third token for d.

In step 602, a base matching graph is created. An example of the base matching graph is shown in FIG. 3B. The base matching graph includes an initial state, a final state, a trash state, and a placeholder for one or more matching subgraph nodes.

In step 604, a matching subgraph node is generated for each of the tokens obtained in step 600. Each matching subgraph node may have the same structure, e.g., the structure shown in FIG. 3C. However, the char state for each of the matching subgraph nodes is associated with an expression based on the information in the corresponding token. For example, if the token is [A-Z], then the corresponding char state may be associated with an expression that confirms whether a given observation is a capital letter.

Continuing with the discussion of FIG. 5B, in step 606, the matching subgraph nodes are linked together. The graph result from the linking of the individual subgraph nodes may be denoted as a matching subgraph. As discussed above, the matching subgraph nodes are linked in a manner that preserves the ordering of the components in the fuzzy regular expression. In one embodiment of the technology, the matching subgraph nodes are linked together using the start and end blocks within the matching subgraph nodes. See e.g., FIG. 6.

In step 608, the matching subgraph is linked to the base matching graph in order to generate the matching graph. In one embodiment of the technology, the start and end blocks in the base matching graph and in the matching subgraph are used to link the matching subgraph with the base matching graph. The skilled in the art will appreciate that the other methods for generating the matching graph from the fuzzy regular expression may be used without departing from the technology. Further, while step 502 and FIG. 5B describe a method for generating the matching graph, the matching graph may be generated by an entity that is external to the document processing system. In such cases, step 502 may involve obtaining the matching graph. At this stage, the matching graph has been generated (or obtained) and the process proceeds to step 504 in FIG. 5A.

Continuing with the discussion of FIG. 5A, in step 504, a weight for each transition in matching graph is calculated. See, e.g., Table 1. In the scenario in which the matching graph is obtained from an entity external the document processing system, the weights calculated in step 504 may also be provided by (or otherwise obtained from) the external entity. In such cases, step 504 may not be performed by the document processing system. In another embodiment of the technology, the weights the transitions may be calculated during step 506 as opposed to in step 504.

In step 506, the best path through the states in the matching graph is determined using the observation nodes in the observation graph obtained in step 500. In one embodiment of the technology, the best path through the states in the matching graph is determined by processing the matching graph and the observation graph at the same time. The goal of the aforementioned processing is to determine the path with the best score which ends at the end state in the observation graph (see FIG. 3A) and the final state in the matching graph (see FIG. 3B). This best path to this end coupled state (e.g., the state that includes the end state and the final state) may be referred to as $\beta_N(S,O)$. The best path may be determined using the Viterbi algorithm.

One recursive formula that may be used to determine the best path is as follows:

$$\beta_N(S, O) = \max_{\substack{S_i \in \{S_{N-1}\} \\ O_j \in \{O_{N-1}\}}} [\beta_{N-1}(S_i, O_j) * T(S_i, S_N) * T(O_j, O_N) * S_N * O_N]$$

where a given state $S_N$ has a set of previous states referred as $S_i \in \{S_{N-1}\}$ (where "previous" means that a direct transition from, $S_{N-1}$ to $S_N$ exists), where observation $O_N$ has a set of previous observations referred as $O_j \in \{O_{N-1}\}$ (where "previous" means that a direct transition from to $O_{N-1}$ to $O_N$ exists), and where T(x,y) is the transition weight (see Table 1) from state x to y in the matching graph or from node x to y in the observation graph.

Those skilled in the art will appreciate that other methods may be used to determine the best path through the matching graph using the observation graph without departing from the technology.

In one embodiment of the technology, the best path through the matching graph corresponds to the path through the matching graph that includes the highest score determined, e.g., using the equation listed above. In the event that there are multiple paths in the observation graph (see e.g., FIG. 7E), then the best path through the matching graph may be determined as follows: (i) determine best path through matching graph for each path in observation graph and (ii) determine the best path as the path in (i) that has the highest score.

Figure 6:
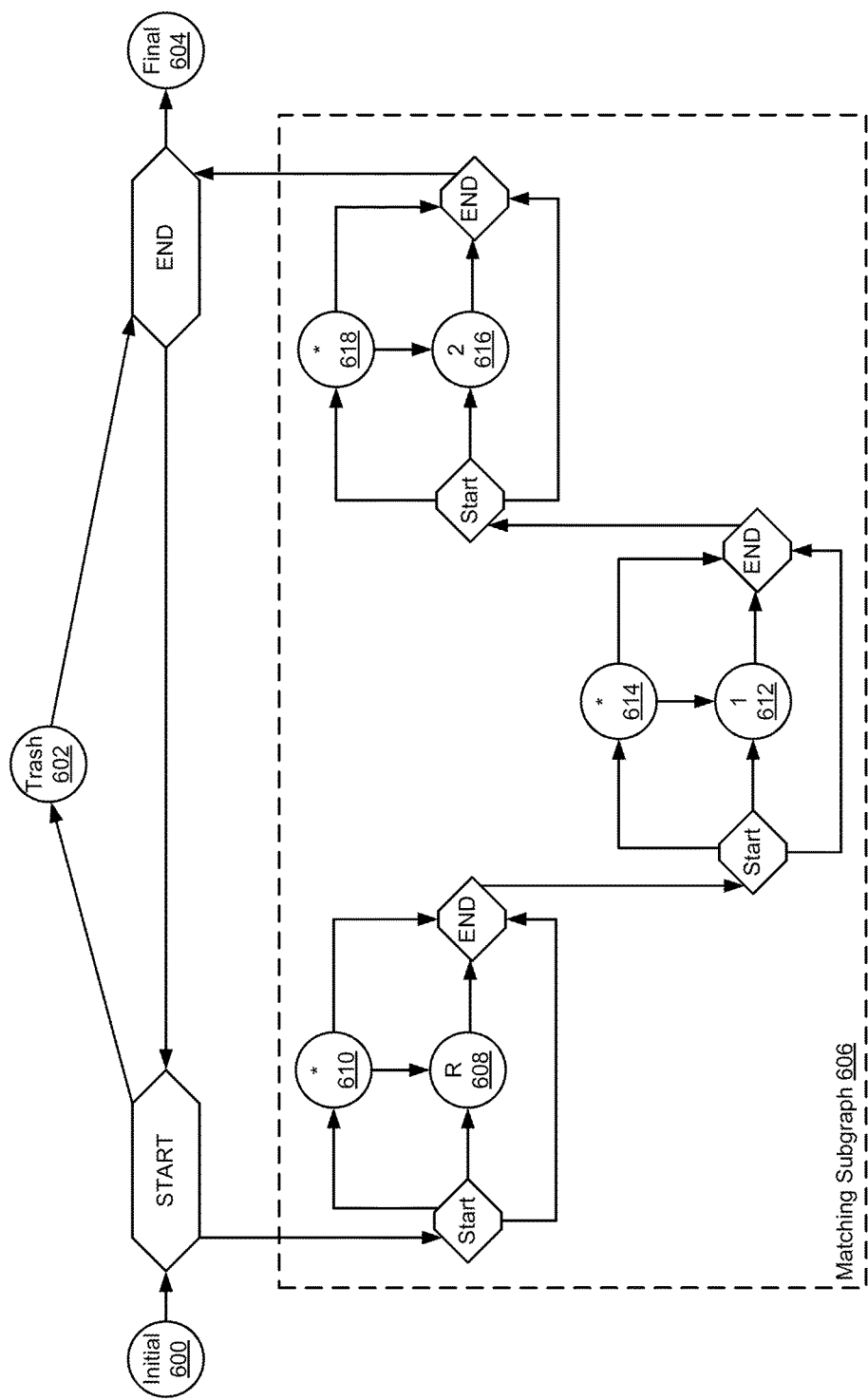
FIG. 6 shows an example matching graph in accordance with one or more embodiments of the technology.

Examples describing the traversal of the matching graph are shown below in FIGS. 6-7E.

Continuing with the discussion of FIG. 5A, in step 508, matching results are generated based on the best path identified in step 506. In one embodiment of the technology, the matching results include a mapping of each observation node in the observation graph to a state in the matching graph. For example, if the fuzzy regular expression was "R12" and the observation graph had the following observation nodes 1→R→1→2→@, then the matching result may be denoted as follows: [Observation "1", Trash state], [Observation "R", char "R" state], [Observation "1", char "1" state], [Observation "2", char "2" state], [Observation "@", Trash state,].

Continuing with the discussion of FIG. 4, in step 408, the matching results may be provided directly to a user computing system for further processing and/or display. In one embodiment of the technology, the fuzzy matching component may automatically modify the matching results prior to sending the matching results to the user computing system. For example, consider a fuzzy regular expression \d{6} (i.e., a six number string) with a threshold of 80%, where the content extracted from the image portion of the document is "227-628". The fuzzy matching component may remove "-" and display a formatted result of "227628".

In step 410, instead of or in addition to step 408, the matching results may be processed using format modifications in order to obtained formatted results. The format modifications may be provided by a user via a user computing system or by an external entity. The following section describes various examples of format modifications. The examples are not intended to limit the scope of the technology.

Example 1

The fuzzy regular expression [A-Z]\d{5} (i.e., a capital letter followed by a five number string) with a threshold of 70%. The content extracted from the image portion of the document is "227628". The format modification may replace the first "2" with "?" to reflect a substitution resulting in "?27628".

Example 2

The fuzzy regular expression [A-Z]{2}\d{10} [A-Z]{2}\d{5} (i.e., two capital letters followed by a ten number string followed by two capital letters followed by five digits). The content extracted from the image portion of the document is "CC7000020ll7DD06010" where an alternate hypothesis for "ll" (i.e., two consecutive instances of lower case letter "L") in the extracted content is "11" (i.e., two consecutive instance of the number one). The format modification may replace the original hypothesis (i.e., "ll") with the hypothesis that matches the fuzzy regular expression. In such a scenario, the formatted result is "CC7000020117DD06010".

Example 3

The fuzzy regular expression is ([A-Z] {2})(\d{10})([A-Z] {2})(\d{5}) and the output format (i.e., format modification) is defined as follows: {1}-{3} #{2} #{4}. In this example, the first group (i.e., {1}) is [A-Z]{2}, the second group (i.e., {2}) is \d{10}, the third group (i.e., {3}) is [A-Z]{2} and the fourth group (i.e., {1}) is \d{5}. Accordingly, the matching result is "CC7000020117DD06010" (see Example 3 above). Based on the format modification, the formatted result is "CC-DD #7000020117 #06010".

Continuing with the discussion of FIG. 4, in step 412, the formatted result are provided to the user computing system for further processing and/or display. The formatted results may be provided to other external entities without departing from the technology.

The following section describes various examples in accordance with one or more embodiments of the technology, the examples are not intended to limit the technology. Turning to the example, FIG. 6 shows an example matching graph in accordance with one or more embodiments of the technology. The matching graph is based on the following fuzzy expression "R12". For the purposes of this example assume that the threshold is 50%. FIGS. 7A-7E show example observation graphs in accordance with one or more embodiments of the technology. The following discussion describes the best path through the matching graph shown in FIG. 6 using the observation graphs shown in FIGS. 7A-7E.

Figure 7A:
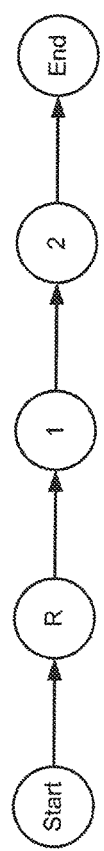
FIG. 7A-7E show example observation graphs in accordance with one or more embodiments of the technology.

Referring to FIG. 7A, FIG. 7A shows an observation graph that includes the following observation nodes—"R", "1", "2". The best path through the matching graph in FIG. 6 for the observation graph in FIG. 7A is as follows: Initial state (600)→"R" state (608)→"1" state (612)→"2" state (616)→final state (604). In this example, the content represented by the observation graph (i.e., content extracted from an image portion of a document) includes a string that matches the fuzzy regular expression.

Figure 7B:
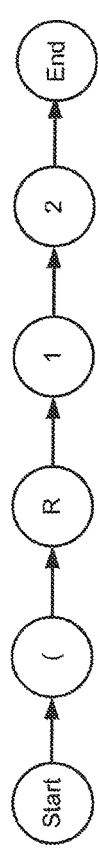

Referring to FIG. 7B, FIG. 7B shows an observation graph that includes the following observation nodes—"(", "R", "1", "2". The best path through the matching graph in FIG. 6 for the observation graph in FIG. 7B is as follows: Initial state (600)→trash state (602)→"R" state (608)→"1" state (612)→"2" state (616)→final state (604). In this example, the content represented by the observation graph (i.e., content extracted from an image portion of a document) includes a string that matches the fuzzy regular expression. Further, in this example, the initial observation node is consumed by the trash state and the subsequent observation nodes are consumed by states in the matching subgraph (606).

Figure 7C:
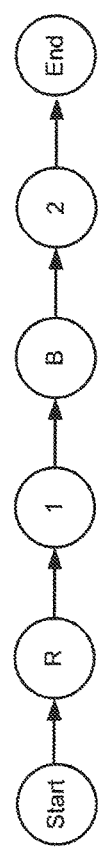

Referring to FIG. 7C, FIG. 7C shows an observation graph that includes the following observation nodes—"R", "1", "B", "2". The best path through the matching graph in FIG. 6 for the observation graph in FIG. 7C is as follows: Initial state (600)→"R" state (608)→"1" state (612)→* state (618)→"2" state (616)→final state (604). In this example, the content represented by the observation graph (i.e., content extracted from an image portion of a document) includes a string that matches the fuzzy regular expression. The content in the observation graph is deemed to match the fuzzy regular expression even though it includes an additional letter (i.e., B) because the threshold associated with the fuzzy regular expression is 50% and "R1B2" matches 66% of the fuzzy regular expression.

Figure 7D:

Referring to FIG. 7D, FIG. 7D shows an observation graph that includes the following observation nodes—"R", "1". The best path through the matching graph in FIG. 6 for the observation graph in FIG. 7D is as follows: Initial state (600)→"R" state (608)→"1" state (612)→final state (604). In this example, the content represented by the observation graph (i.e., content extracted from an image portion of a document) includes a string that matches the fuzzy regular expression. The content in the observation graph is deemed to match the fuzzy regular expression even though it is missing a component of the fuzzy regular expression (i.e., 2) because the threshold associated with the fuzzy regular expression is 50% and "R1" matches 66% of the fuzzy regular expression.

Figure 7E:
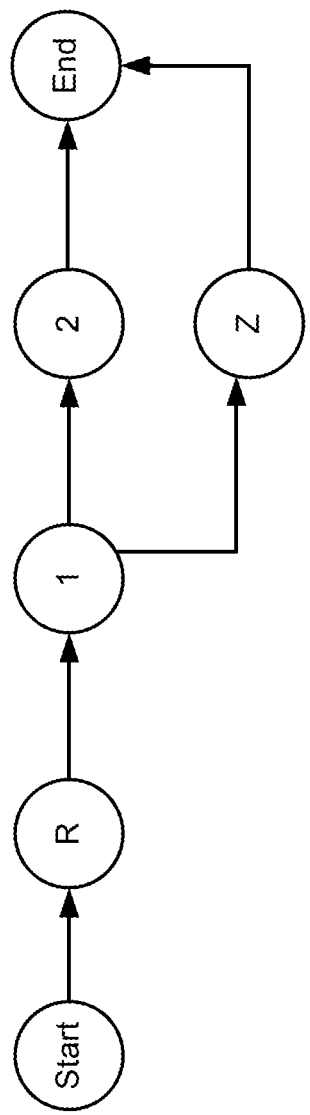

Referring to FIG. 7E, FIG. 7E shows an observation graph that includes the following observation nodes—"R", "1", "2", "Z". In order to determine that the above path is the best path for the matching graph when traversing the states in the observation graph shown in FIG. 7E, a best path in the matching graph must be determined for each of the following paths through the observation graph: Path 1—"R"→"1"→"2"; Path 2—"R"→"1"→"Z". In the instance example, the best path through the matching graph in FIG. 6 using path 1 has a higher score than the best path through the matching graph in FIG. 6 using path 2. Accordingly, the best path through the match graph in FIG. 6 for the observation graph shown in FIG. 7E is: Initial state (600) →"R" state (608)→"1" state (612)→state "2"→final state (604). In this example, the content represented by the observation graph (i.e., content extracted from an image portion of a document) includes a string that matches the fuzzy regular expression.

Figure 8:
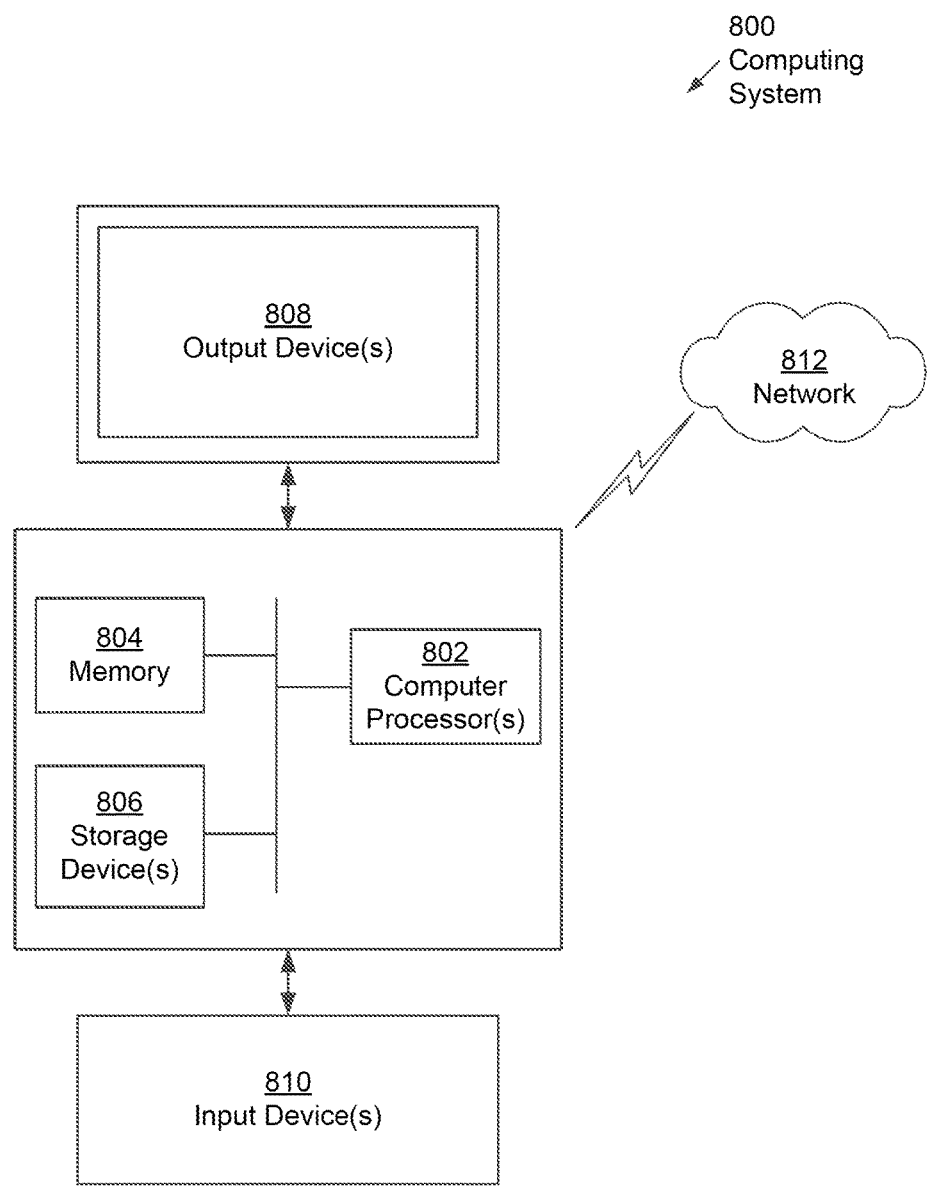
FIG. 8 shows an example computing system in accordance with one or more embodiments of the technology.

Embodiments of the technology may be implemented on a computing system. Any combination of mobile, desktop, server, embedded, or other types of hardware may be used. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (800) may be located at a remote location and connected to the other elements over a network (812). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

Those skilled in the art will appreciate that while this technology is described with respect to extracting content from documents using OCR and then subsequently analyzing the content using the methods described in FIGS. 4-5B, the technology is not limited to analyzing content obtained using OCR. Rather, embodiments of the technology may be used to analyze any obtained content using any known or later discovered mechanism provided that a corresponding observation graph may be generated from the obtained content.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:
1. A method for processing documents, comprising:
  obtaining optical character recognition (OCR) results for a document;
  processing the OCR results using a matching graph to obtain matching results, comprising:
    generating an observation graph using the OCR results; and
    determining a best path in the matching graph, the matching graph comprising:
      an initial state, a final state,
at least one matching subgraph node between the initial state and the final state, and
a trash state, between the initial state and the final state, wherein the trash state and the at least one matching subgraph node are not directly connected by any edge in the matching graph,
wherein determining the best path in the matching graph comprises traversing the matching graph at least once, from the initial state to the final state via the at least one matching subgraph nodes, using observation nodes in the observation graph; and
providing the matching results to a user computing system.

2. The method of claim 1, wherein the observation graph comprises at least one branch.

3. The method of claim 1, wherein the at least one matching subgraph node comprises an exact match state and a wildcard state.

4. The method of claim 1, further comprising:
generating the matching graph using a fuzzy regular expression.

5. The method of claim 4, wherein the matching graph comprises a matching subgraph node for each component of the fuzzy regular expression.

6. The method of claim 1, wherein the OCR results comprise a set of hypotheses, wherein each hypothesis in the set of hypotheses is associated with a confidence score.

7. The method of claim 1, wherein the matching graph comprises a plurality of transitions, wherein each of the plurality of transitions is associated with a weight, and wherein the weight of at least one of the plurality of transitions is one selected from a group consisting of a weight for a correct match, a weight for an insertion, a weight for a substitution, and a weight for a deletion.

8. The method of claim 1, wherein the matching graph comprises a plurality of transitions, wherein each of the plurality of transitions is associated with a weight determined using at least one selected from a group consisting of a matching threshold and a trash score.

9. The method of claim 1, wherein the matching results comprise at least a partial match of a fuzzy regular expression, wherein providing the matching results to the user computing system comprises modifying at least the partial match prior to obtain a modified match result, wherein the modified match result is provided to the user computing system.

10. A system, comprising:
a processor comprising an integrated circuit;
an optical character recognition (OCR) component executing on the processor, configured to:
obtain OCR results for a document; and
a fuzzy matching component executing on the processor, configured to:
receive the OCR results for the document; and
process the OCR results using a matching graph to obtain matching results, the processing the OCR results comprising:
generating an observation graph using the OCR results; and
determining a best path in the matching graph, the matching graph comprising:
an initial state,
a final state,
at least one matching subgraph node between the initial state and the final state, and
a trash state, between the initial state and the final state, wherein the trash state and the at least one matching subgraph node are not directly connected by any edge in the matching graph,
wherein determining the best path in the matching graph comprises traversing the matching graph at least once, from the initial state to the final state via the at least one matching subgraph nodes, using observation nodes in the observation graph;
wherein the matching results are provided to a user computing system operatively connected to the system.

11. The system of claim 10, further comprising:
a format modification component executing on the processor, configured to modify at least a partial match of a fuzzy regular expression to obtain a modified match result, wherein the modified match result is provided to the user computing system.

12. The system of claim 10, wherein the observation graph comprises at least one branch.

13. The system of claim 10, wherein the at least one matching subgraph node comprises an exact match state and a wild card state.

14. The system of claim 10, wherein the fuzzy matching component is further configured to:
generate the matching graph using a fuzzy regular expression, wherein the matching graph comprises a matching subgraph node for each component of the fuzzy regular expression.

15. The system of claim 10, wherein the matching graph comprises a plurality of transitions, wherein each of the plurality of transitions is associated with a weight, and wherein the weight of at least one of the plurality of transitions is one selected from a group consisting of a weight for a correct match, a weight for an insertion, a weight for a substitution, and a weight for a deletion.

16. The system of claim 10, wherein the matching graph comprises a plurality of transitions, wherein each of the plurality of transitions is associated with a weight determined using at least one selected from a group consisting of a matching threshold and a trash score.

17. A non-transitory computer readable medium comprising computer readable program code, which when executed by a computer processor enables the computer processor to:
obtain a data model for content of a document;
generate a matching graph, the matching graph comprising:
an initial state,
a final state,
at least one matching subgraph node between the initial state and the final state, and
a trash state, between the initial state and the final state, wherein the trash state and the at least one matching subgraph node are not directly connected by any edge in the matching graph,
wherein generating the matching graph comprises using a fuzzy regular expression, wherein the matching graph comprises a matching subgraph node for each component of the fuzzy regular expression and a trash state;
process the data model using the matching graph to obtain matching results; and
provide the matching results to a user computing system,
wherein processing the data model comprises:
generating an observation graph using the data model; and
determining a best path in the matching graph using observation nodes in the observation graph to transition between states of the matching graph,
wherein determining the best path in the matching graph comprises traversing the matching graph at least once, from the initial state to the final state via the at least one matching subgraph nodes, using observation nodes in the observation graph, wherein the at least one matching subgraph node comprises an exact match state and a wildcard state, wherein the matching graph comprises a plurality of transitions, wherein each of the plurality of transitions is associated with a weight determined using at least one selected from a group consisting of a matching threshold and a trash score.

* * * * *